United States Patent [19]
White

[11] 3,742,350
[45] June 26, 1973

[54] PULSE TRAIN METHOD AND APPARATUS FOR LOCATING AND IDENTIFYING CONDUCTORS IN A CABLE

[76] Inventor: David Walter James White, Tilstock House, Tilstock, near Whitchurch, England

[22] Filed: Oct. 21, 1970

[21] Appl. No.: 82,751

[30] Foreign Application Priority Data
Oct. 22, 1969 Great Britain................... 41,719/69

[52] U.S. Cl. ................................................. 324/66
[51] Int. Cl. ............................................. G01r 19/16
[58] Field of Search ................ 324/66, 52; 340/206, 340/413, 147 P

[56] References Cited
UNITED STATES PATENTS
1,900,425  3/1933  Woodbury ........................... 324/66
3,377,585  4/1968  Magnin ............................... 340/206
3,076,931  2/1963  Jasper ................................. 324/66
2,789,268  4/1957  Bechtel et al. ...................... 324/66
3,054,949  9/1962  Bates et al. ......................... 324/66

Primary Examiner—Gerard R. Strecker
Attorney—Woodhams, Blanchard & Flynn

[57] ABSTRACT

A system for testing the individual conductors in a multi-core cable, such as a telephone cable by passing along a conductor under test a series of pulse trains. The system offers a number of facilities. An individual wire can be located and identified and the system can give an indication of a short circuit between a conductor under test and any other conductor in the cable.

8 Claims, 12 Drawing Figures

INVENTOR:
DAVID W. J. WHITE
BY
Woodhams, Blanchard & Flynn
ATTORNEYS

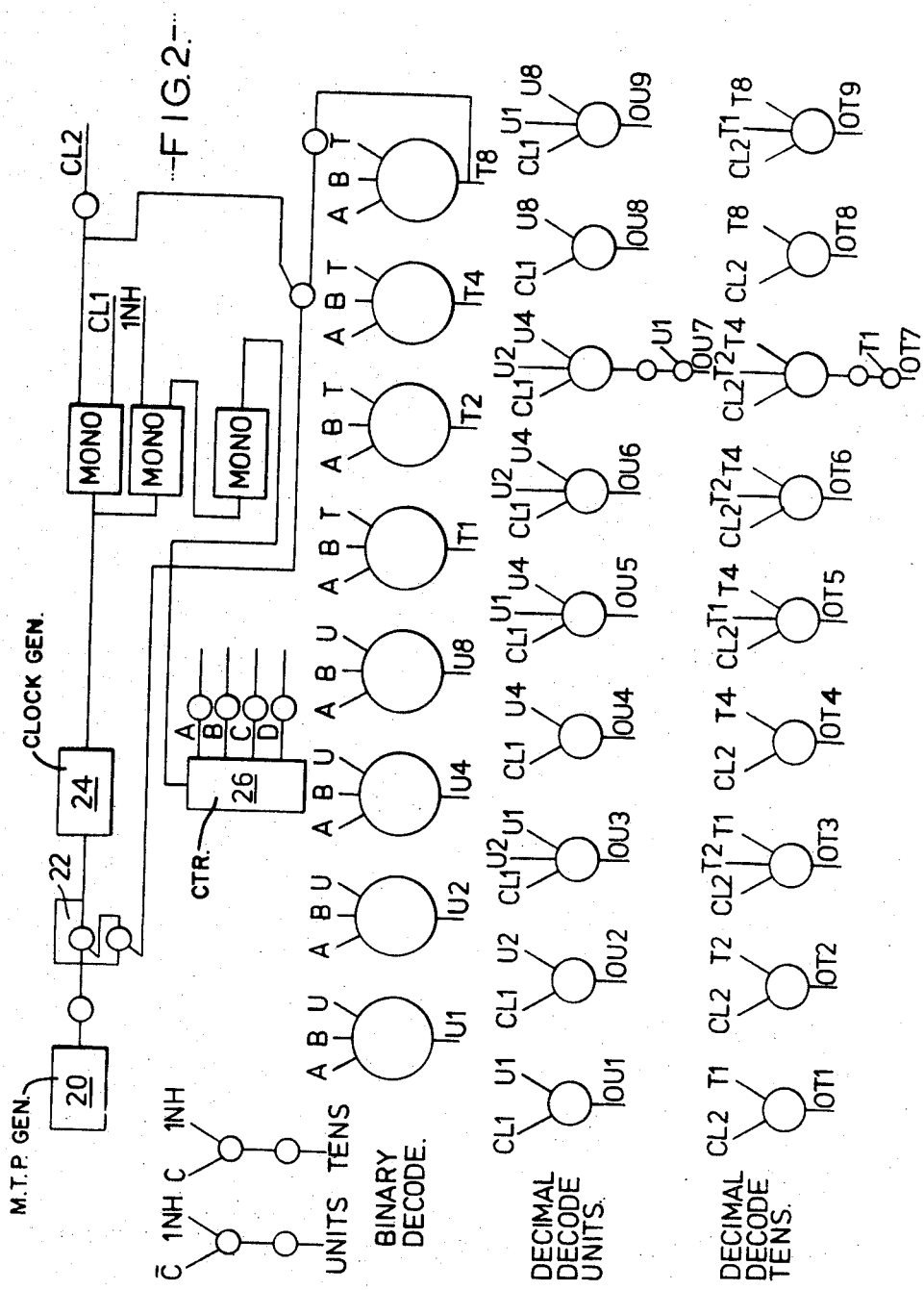

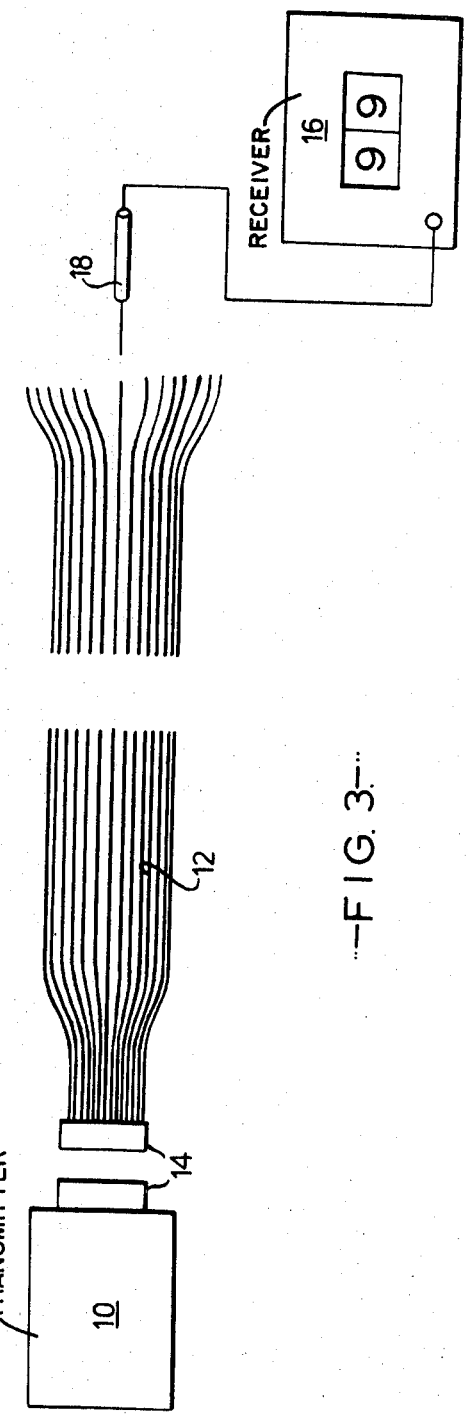

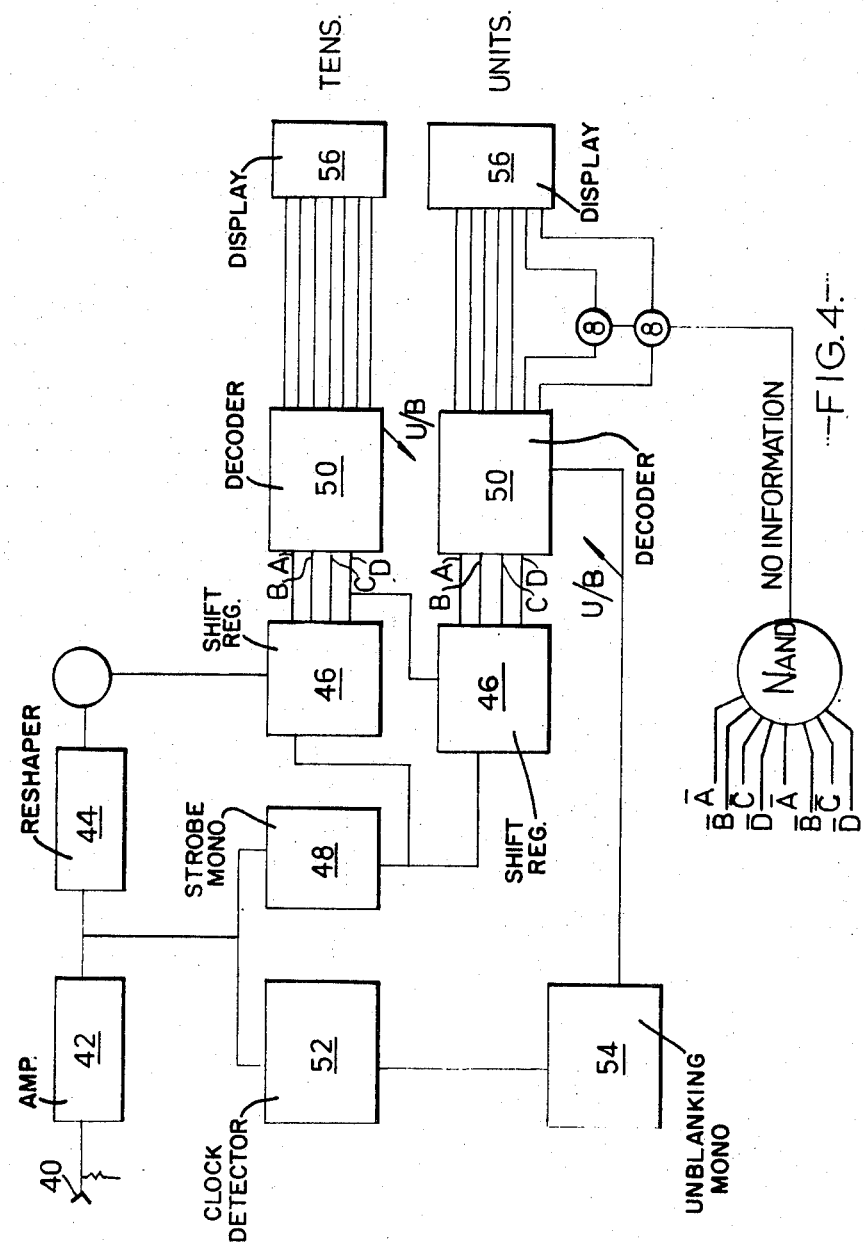

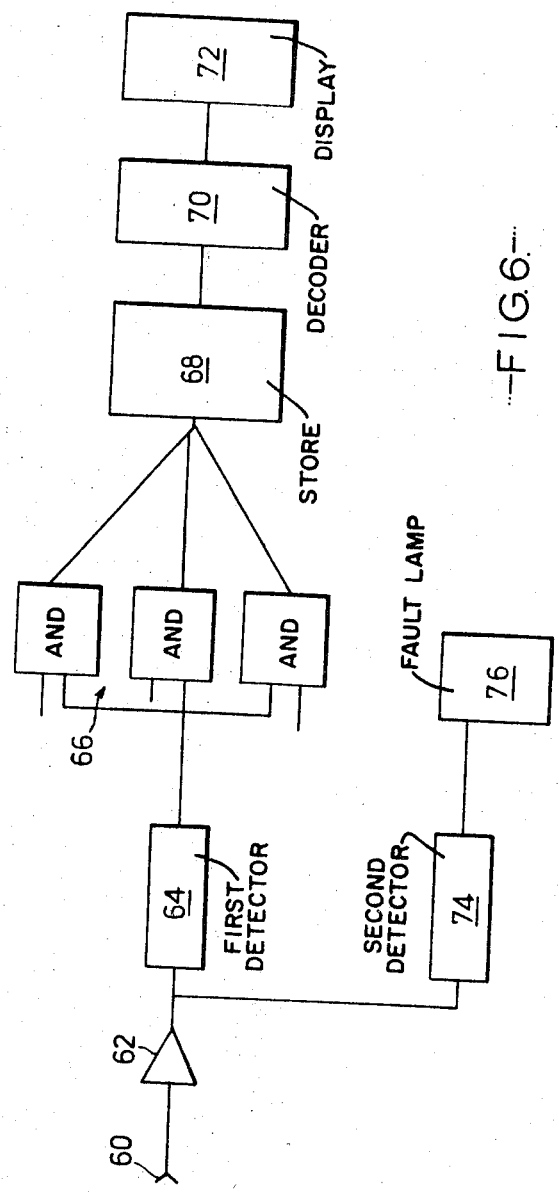
-FIG.6-

PULSE TRAIN METHOD AND APPARATUS FOR LOCATING AND IDENTIFYING CONDUCTORS IN A CABLE

The present invention relates to a method and apparatus for distinguishing and identifying one member from a plurality of identical members. In particular the invention is concerned with a method and apparatus for distinguishing and identifying the individual wires in a multi-wire cable, such as a telephone cable.

It is known to identify wires in a wiring assembly by marking each wire with a color code or an identifying sleeve. However this has the disadvantage of adding to manufacturing costs and time and errors in the original marking can lead to confusion. Furthermore, the markings may be obliterated with time.

It is also known to test wires by means of buzzers, lights or meters. However such testing frequently requires the services of two operators, one at each end of the wires being tested, with some form of communication between them.

The present invention seeks to overcome the disadvantages encountered in present methods and apparatus by applying to each wire of a cable an individual electrical or electronic signal which can readily be identified by an operator.

Thus according to one aspect of the present invention a method of distinguishing and identifying one member from a plurality of identical members, such as a wire in a multi-wire cable, comprises generating a series of electrical or electronic pulse signals and applying said signals to each member, superimposing on said pulse signals a signal peculiar to each individual member and detecting the resultant output whereby to positively identify each member.

According to another aspect of the present invention an apparatus for distinguishing and identifying one member from a plurality of identical members, such as a wire in a multi-wire cable, comprises transmitter means for generating and applying to each member a series of pulse trains having superimposed thereon a signal peculiar to each individual member and means for detecting and recording the resultant output whereby to positively identify each member.

The invention will be described further, by way of example, with reference to the accompanying drawings; in which:

FIG. 2 represents schematically an arrangement for producing pulse trains as in FIGS. 1a, 1b and 1c;

FIG. 3 illustrates, diagrammatically, one form of apparatus according to the invention;

FIG. 4 is a schematic diagram of a receiver;

FIG. 6 is a schematic diagram of an alternative form of receiver.

Figure 1A:
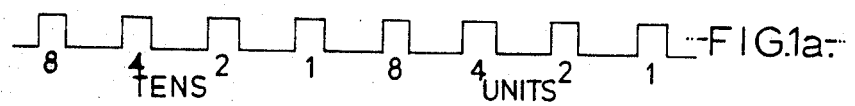
FIGS. 1a, 1b and 1c illustrate examples of one form of pulse train applied to a conductor.

The apparatus comprises a transmitter or encoder for producing pulses to be applied to the wires of a multistrand cable and a receiver or detector for receiving and identifying the pulses.

The transmitter 10 basically comprises a pulse generator 20 adapted to produce a master timing pulse at definite intervals. For the sake of example only it is hereinafter assumed that a master timing pulse is produced once every third of a second, i.e. the generator produces 3 pulses per second. The output of the generator is shaped to produce stable jitter free pulses.

The output pulses from the generator actuate a bistable latch circuit 22 which in turn controls a clock generator or trigger 24. The clock generator produces a series of pulses of 1 millisecond duration, each pulse being separated from its immediately preceding and following pulses by an interval of 2 milliseconds. Thus the output from the clock generator comprises a train of 1 millisecond pulses separated by 2 milliseconds. The 2 millisecond interval between the 1 millisecond pulses is utilized to receive an information signal of 1 millisecond duration and an inhibit signal of 1 millisecond duration. The combination of the original 1 millisecond pulse signal and 1 millisecond information signal is utilized according to the binary code to produce a representative signal for each wire of a cable whilst the inhibit signal returns the pulse level to zero prior to the arrival of the immediately following 1 millisecond pulse signal.

Again purely for the sake of example it is assumed that the apparatus is to be used in conjunction with a cable having a maximum of 99 wires. In such a case it is necessary for the transmitter to produce trains of successive eight 1 millisecond pulses along each wire in order that each wire can be individually labelled utilizing the binary code. These eight pulses define four pulses associated with units 1, 2, 4, and 8 respectively and four pulses associated with tens 1, 2, 4 and 8 respectively according to standard binary code practice. Thus the first four pulses of each group of eight are utilized for units and the second four pulses of the group are utilized for tens.

The following table illustrates the binary code relationship for the eight pulse group.

| Pulse | Counter D C B A | Binary Equivalent |
|---|---|---|
| 0 | 0 0 0 0 | Units 1 |
| 1 | 0 0 0 1 | Units 2 |
| 2 | 0 0 1 0 | Units 4 |
| 3 | 0 0 1 1 | Units 8 |
| 4 | 0 1 0 0 | Tens 1 |
| 5 | 0 1 0 1 | Tens 2 |
| 6 | 0 1 1 0 | Tens 4 |
| 7 | 0 1 1 1 | Tens 8 |

The above eight pulses can now be combined to give 99 separate signals.

In practice in eight pulses operate a 4 bit binary counter and selection logic in such a way that units and tens signals are produced and gated on to sub-output wires to cause selected pulse patterns representing BCD equivalents of the decimal identifiers to be produced. 18 sub-output wires are required, wires 1 to 9 representing the unit digits 1 to 9 respectively and wires 10 to 18 representing the ten digits 10 to 90 respectively. Zeros are not required as non-alternative decoding is utilized.

As mentioned previously each pulse is separated from its immediately following pulse by an interval of 2 milliseconds to enable an information signal of 1 millisecond duration to be added to the standing 1 millisecond pulse. This information pulse effectively identifies the binary pulse or pulses required for identifying the wires. Thus normally the wave train applied to each wire of the cable appears as in FIG. 1a. A series of such wave trains will be applied to each wire, each wave train being separated from an immediately preceding and following wave trains by a suitable time interval, for example 400 milliseconds.

By addition of an information pulse so as to widen the 1 millisecond pulses above from 1 millisecond duration to 2 milliseconds an unique marking is obtained as the relationship between binary and decimal equivalents is as follows.

| Decimal | Binary Equivalents |
|---|---|
| 1 | B1 |
| 2 | B2 |
| 3 | B1 + B2 |
| 4 | B4 |
| 5 | B4 + B1 |
| 6 | B4 + B2 |
| 7 | B4 + B2 + B1 |
| 8 | B8 |
| 9 | B8 + B1 |

The above relationship holds for all factors of 10.

Figure 1B:
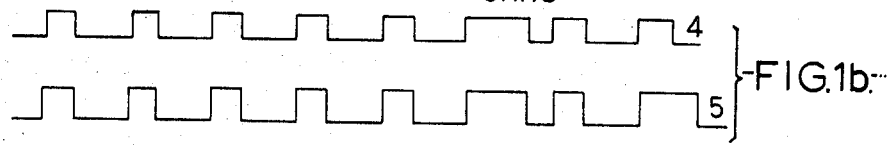
Figure 1C:
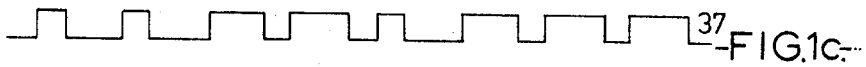

Thus if an information pulse is added to the unit binary pulse 4 the resulting signal indicates the decimal equivalent 4. If information pulses are added to unit binary pulse 4 and 1 the resulting signal is indicative of decimal 5. This is illustrated in FIG. 1b. It will be readily apparent that by inclusion of information pulses in the binary tens pulses that any combination of 1 to 99 can be obtained. Thus 37 will be represented by the pulse signal represented in FIG. 1c.

The transmitter therefore produces the above distinctive signals which are applied to the wires of a cable through a plug. The output from the four bit counter 26 is applied to NAND gates of first a Binary decoder represented in the accompanying FIG. 2 by eight gates, four associated with units and four associated with tens. In the example of a 99 wire cable it is to be noticed that the D or $\bar{D}$ output of the 4 bit counter is not used, this output only being necessary for large cables of greater than 100 wires. The C output of the counter controls the production of the pulses in such a way that when C is at a logical 1 level the TENS gates are enabled, and when C is at a logical 0 level the UNITS gates are enabled. Reference is drawn to the table on page 5 illustrating this point.

The output from the four bit counter is applied to a binary decode unit comprising eight NAND gates as shown in the FIG. 2, the first four gates being associated with units scale and the second four gates with tens scale. Each gate has inputs A or $\bar{A}$; B or $\bar{B}$ and U or T. The latter denote units and tens and are controlled by the C or $\bar{C}$ output of the counter, which as mentioned above distinguishes between a unit and a 10 signal.

The output $\bar{U}1$, $\bar{U}2$, $\bar{U}4$ and $\bar{U}8$ of the unit gates of the binary decoder are applied to the nine unit gates of the decimal decoder as shown in the diagram. A clock pulse is also applied to the gates of the decimal decoder and the resultant decimal outputs represent respectively units 1 to 9. It is to be noticed that for unit 7 the conversion from binary to decimal involves the combination of three binary codes namely $\bar{U}1$, $\bar{U}2$ and $\bar{U}4$. The three inputs of the gate are thus preferably connected to receive the respective three binary signals and the clock pulse is applied to the output of this 7 gate.

In a similar manner the outputs $\bar{T}1$, $\bar{T}2$, $\bar{T}4$ and $\bar{T}8$ of the "ten" gates of the binary decoder are applied to the nine "ten" gates of the decimal decoder.

After a sequence of eight pulses has passed down each line the clock trigger is turned off and the current is quiescent until the arrival of the next master timing pulse when the cycle is repeated.

A diode matrix may be used to combine the binary codes on the sub-lines, and the gates are grouped in sets, one set for each 100 output lines. Expansion of the circuit is thus possible in groups of 100 lines.

Thus a distinctive pulse signal is applied to each wire, the signal being carried by the successive trains of eight pulses passing along each wire of a cable.

The end of the cable remote from the transmitter is coupled to a receiver which distinguishes the different signals in the wires. This may be achieved by contacting each wire in turn with a probe. The receiver may be considered to perform in a reverse manner to the transmitter as the incoming information is transformed back to ICP logic levels. A delay circuit produces a delayed strobe times to coincide with the position of information on each wire.

FIG. 3 illustrates diagrammatically a transmitter or encoder 10, a multi-wire cable 12 which is arranged to be connected to the encoder 10 through a plug 14, and a receiver or display unit 16. A hand probe 18 is utilized for connecting each or a desired end of a wire successively to the display unit 16.

The receiver in effect scans each series of eight pulses passing along a wire contacted by the probe for an information signal or signals. As previously mentioned these information signals of 1 millisecond duration appear immediately following the 1 millisecond clock pulse. The strobe scans the center portion of each second millisecond of the 3 millisecond pulse band of the eight pulse train. Upon the presence of an information signal this is applied to the serial input of an 8 bit shift register so that the information representing cable identifiers is copied into the shift register. Normal BCD to decimal decoding and driver stages are selected to operate a display device according to whether the display device is a 7 segment or single lamp display. In the 7 segment display a numerical representation of the signal is given.

FIG. 4 is a schematic diagram of one form of receiver or detector. Information from the line contacted by the probe input 40 is amplified by amplifier 42 re-shaped at 44 and applied as serial input to an 8 bit shift register 46. Entry to shift register is controlled by negative slope of waveform produced by "STROBE MONO," this slope occurs 1.5 milliseconds after clock waveform starts "STROBE MONO" 48. Only widened pulses are thus selected into the SHIFT REGISTER 46, other non-widened clock pulses merely cause the SHIFT REGISTER to shift down one place. At the end of the eight clock pulses the SHIFT REGISTER outputs will each contain "1" where information was widened, and "0" where it was not, and this is decoded from BCD TO decimal by the "7 SEG DECODERS" 50.

The shifting process would cause flicker of the display, and "CLOCK DETECTOR" 52 and "UNBLANKING MONO" 54 prevent this, and also turn off the display when not actually in use.

"CLOCK DETECTOR" 52 is a retriggerable delay with a delay time of 2.5 milliseconds approximately. First clock pulse operates this delay, and succeeding pulses re-set the delay until the end of the clock pulses. At this time the delay is allowed to operate, and fires "UNBLANKING MONOSTABLE" 54, which enables the 7 segment displays 56 for approximately 300 milliseconds, before blanking out to await the next series.

It can be shown that if a seven segment display is set to display "0" by extinguishing the two Right Hand bars the displayed "0" is shown as C.

Logic is included in the receiver to detect the condition caused by capacitive coupling to an open circuit wire.

Because of the capacitance of other cables the differentiated clock waveform appears on the open circuit wire, causing the "SHIFT REGISTER" to step, but not record information. Hence at the end of such a count the display would indicate "00."

The "NO INFORMATION" detector will then operate and extinguish the two right hand bars of the UNITS indicator, giving the display OC - indicating to the user that the wire is open circuit.

As an alternative to the above method of coding, a train of identical pulses can be passed along each wire of a cable and a selected pulse passing along each wire can be used to identify that wire.

For example in a cable composed of 99 wires, a train of 99 basic pulses, each pulse being of 1 millisecond duration and separated from an immediately following pulse by a time interval of 2 milliseconds, is applied to each wire in the cable. A convenient waiting time between successive trains of 99 pulses applies to each wire is 300 milliseconds. It will be appreciated that the above are examples only of suitable pulse width, pulse separation and waiting time.

Figure 5A:
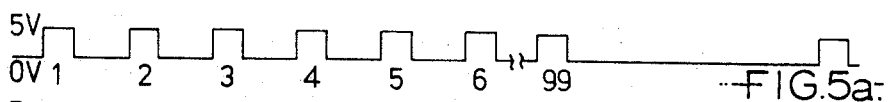
FIGS. 5a, 5b, 5c and 5d illustrate examples of a second form of pulse train.
Figure 5B:
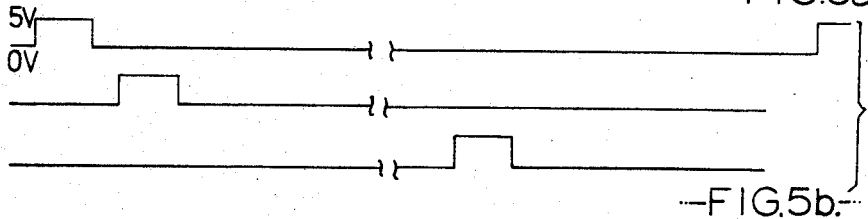
Figure 5C:
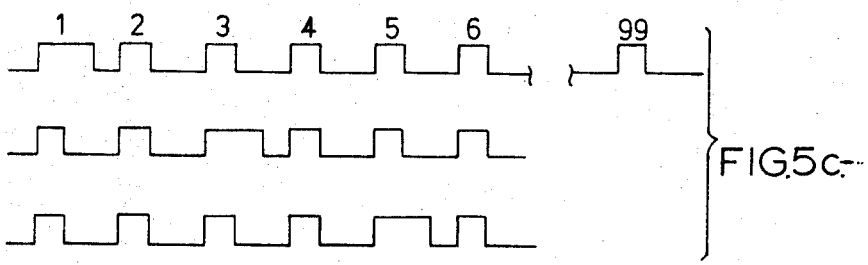

In addition to producing the 99 basic pulses the encoder also produces special pulses, one for each wire, and which are combined with the basic pulses n such a way as to identify each individual wire in the cable. Thus each pin of the output plug of the encoder is coded with 99 basic pulses only one of which is widened by a signal pulse of say 2 millisecond duration. This is illustrated in FIG. 5. FIG. 5a shows a train of 99 basic pulses. FIG. 5b shows signal pulses to be applied to wires number 1, 3 and 5 of the cable. FIG. 5c shows the wave trains resulting from the superposition of the pulses in FIGS. 5a and 5b and from which it is seen that each wire is individually coded.

Figure 5D:

If the wires are connected together at their ends or at any point along their lengths then each wire will carry pulses representing the logical function "OR" or "MIX" and each will carry the wave train represented in FIG. 5d. Advantage is taken of this to detect an accidental connection or short-circuit between two or more wires in a cable under test.

Figure 7:
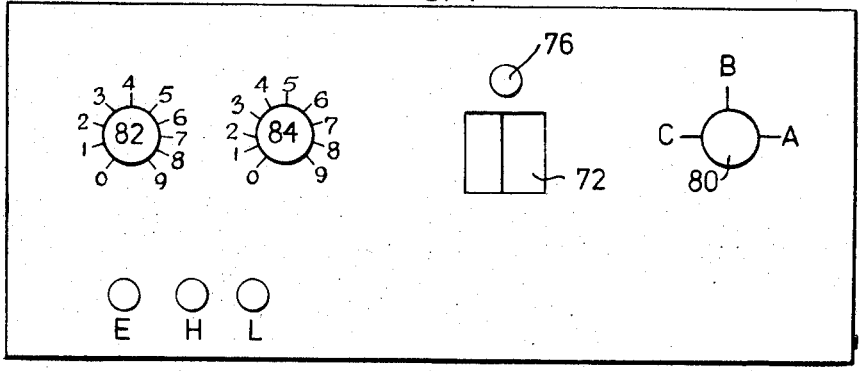
FIG. 7 shows an arrangement of controls on the receiver of FIG. 6.

FIG. 6 represent schematically an alternative form of detector suitable for this purpose and FIG. 7 shows an arrangement of controls on the detector.

In FIG. 6, probe 60 is connected through amplifier 62 to a wide pulse detector 64. The detector 64 is connected to three AND gates 66 in parallel and the output from the gates passes to a store 68, a decoder 70 and a display indicator 72. A second wide pulse detector 74 is connected between the amplifier and first wide pulse detector 64 and its output is connected to a fault lamp 76.

The detector has three modes of operation as selected by a mode switch 80 (FIG. 7). These modes are Search, Identify and Find Short-Circuit, denoted by A, B, and C respectively in FIG. 7.

When the probe 60 is in electrical contact with a conductor to be identified, said conductor carrying a train of pulses as shown in FIG. 5c for example then the display indicator 72 will display in decimal form the number of the coded information applied to that conductor by the encoder when the switch 80 is set to position B. Alternatively, if the conductor is in electrical contact with one or more other conductors, then the indicator 72 will display the lowest number of the coded information applied to the contacting conductors. A fault lamp 76 will illuminate in such a situation thus indicating that a short circuit exists between the conductor whose identity is displayed on the indicator 72 and one or more other conductors.

For example, with reference to FIG. 5d, if the probe contacts one of the conductors 1, 3 and 5, and these conductors are in electrical contact, then the indicator 72 will display 01 and lamp 76 will illuminate. Switch 80 is set to position C and if the number displayed is set on decade switches 82 and 84, then the indicator will display 03 with lamp 76 still illuminated. If the decade switches 82 and 84 are set to 03 then the indicator will display 05 and the lamp 76 will extinguish indicating that no further wires are to be identified. This method can be applied to any number of wires.

The invention further provides a method of searching and locating an individual wire in an assembly. This is achieved with switch 80 in position A and systematically grouping the wire assembly into two groups by short-circuiting or grouping together the ends of the wires into two groups. The groups need not be made up of the same number of wires. Purely for the sake of example let it be assumed that it is required to locate wire No. 57 in a cable composed of 100 wires. The ends of the wires at the cable outlet are divided into two approximately equal groups by twisting the bared ends together. The wire 57 will then be in one of these two groups. One of the groups is then contacted by the probe of the display unit and with the switches 82 and 84 set to the number of the wire 57 the display indicator will indicate the searched for wire number only if the wire 57 is amongst the wires of the contacted group. Clearly if the display unit does not indicate the searched for wire number then the wire 57 will be amongst the wires of the second ground not contacted by the probe. Proceeding thus by successively halving the groups which cause the display unit to indicate the wire number provides a quick and simple method of locating the wire 57. The warning lamp will illuminate until the searched for wire 57 is identified on its own.

The wires in a group can be connected together by baring their ends and twisting these together or contacting them to a conducting metal plate. Alternatively the bared ends of the wires can be embedded in a porous material saturated with a conductive solution. For example a sponge saturated with a common salt solution. The probe of the display unit is then brought into contact with the twisted wires, plate or sponge.

By increasing the input impedance of the amplifier in the display unit it is possible to dispense with a metallic probe and use the conductive path provided by the fingers of the hand. The conductors under test can be gripped firmly with the fingers and a signal is conducted via the resistance of the human body to enable the display unit to function. Clearly an electrical lead will connect the amplifier to the hand by being attached at one end to a wrist band for example.

Both the encoder and display unit can be powered from batteries or a mains supply and if powered from batteries they are easily transportable. The probe may be formed integral with the display unit so as to provide an instrument that can be carried in the hand of an operator.

The invention thus provides a method and apparatus for immediately identifying the individual wires in a cable. It will be appreciated that whilst the foregoing description has been directed to a 100 wire cable the invention is not limited to such a cable and is equally applicable to a 1,000 wire or 10,000 wire cable. It is envisaged that the invention will be particularly advantageous in the telecommunication and computer industries.

What I claim is:

1. A method of distinguishing and identifying one member from a plurality of identical members, such as a conductor in a cable having at least ten identical conductors, comprising:

generating successive trains of eight identical electrical pulses and applying said successive pulse trains to each member;

labeling each member at one end thereof by superimposing on said pulses a signal peculiar to that member, said signal comprising at least one additional pulse having a pulse width greater than the width of the pulses in said trains whereby to achieve a binary coding for each member; and positively identifying each member at a position therealong remote from said one end by detecting the superimposed signal and converting same into a permanent visible display;

wherein said labeling step includes counting the pulses of each train with a counter producing binary coded parallel outputs, decoding said binary coded outputs to produce a series of said additional pulses in synchronism with said train of eight pulses, each said additional pulse of said series appearing at a corresponding one of eight binary decoder terminals, separately decimally decoding the outputs on each of two separate groups of four each of said binary decoder terminals to produce on nine "units" decimal decoder terminals nine individual patterns of said additional pulses superimposed on the first occurring four pulses of said train and to thereafter produce on nine "tens" decimal decoder terminals nine individual patterns of said additional pulses superimposed on the last occurring four pulses of said train, connecting each member to at least one of said decimal decoder terminals but no more than one of each of said "units" terminals and "tens" terminals, each member being uniquely connected to said decimal decoder terminals whereby to enable supplying of unique composite signal to each of 99 members.

2. A method as claimed in claim 1, in which said identifying step comprises detecting the superimposed signals by means of a probe in electrical contact with one or a plurality of members and displaying the so-detected signals.

3. A method as claimed in claim 2 in which said identifying step includes amplifying the detected superimposed signals to a level and phase suitable to operate integrated circuits.

4. An apparatus for distinguishing and identifying one member from a plurality of identical members, such as a conductor in a cable having a substantial number of conductors, comprising:

transmitter means for generating a uniform series of identical pulses having superimposed thereon a signal peculiar to each member to form a unique composite signal for each member, said transmitter means including master generator means for generating a series of master timing pulses each marking a first time period, clock generating means responsive to said generator means for generating said series of identical pulses, said series of identical pulses comprising a fixed number of regularly spaced clock pulses and occurring during each said first time period, said number of clock pulses being related in a preselected manner to the number of members, said number of clock pulses being sufficient to establish a number of unique binary code groups at least equal to the number of members, and identifying pulse producing means responsive to said clock generating means for producing said signals peculiar to each member, said signals comprising identifying pulses to be superimposed on said clock pulse series, each such identifying pulse having a fixed time relation to a different one of said clock pulses in said series, said identifying pulse producing means including a parallel output binary counter which counts in timed relation to said clock pulses and means responsive to said clock pulses for periodically actuating said counter, said transmitter means further including means applying said composite signals to respective ones of said members for uniquely labeling same, said applying means including means imposing the same clock pulse series on each of said members but with at least one of said identifying pulses superimposed on such clock pulse series and with the combined pattern of clock and identifying pulses imposed on each member being unique, said imposing means including a set of binary decoding gates each responsive to a different combination of counter outputs and at least one set of decimal decoding gates each responsive to a different combination of binary decoding gate outputs and means for connecting outputs of said decimal decoding gates in unique combinations to corresponding ones of said members whereby each member carries a unique multibit binary coded identifying pulse signal; and receiver means responsive to the composite signal on a member for detecting and recording the superimposed signal whereby to positively identify such member, said receiver means including means connectible to at least one said member and means coupled thereto and responsive to said combined pattern for uniquely identifying said member, said connectible means comprising a probe, said pattern responsive means including shift register means having a plurality of binary outputs and decimal decoder means connected to said binary outputs and having a plurality of decimal output lines, the pattern of actuation of which uniquely identifies the one of said members contacted by said probe.

5. Apparatus as defined in claim 4 in which the identifying pulses each at least in part occupy a portion of the space between a corresponding clock pulse and the succeeding clock pulse in the series, said receiver means including strobe means responsive to each said clock pulse for detecting a succeeding identifying pulse.

6. Apparatus as claimed in claim 4, in which said receiver means further includes display means connected to said decoder means for displaying the identity of the member contacted by said probe, said receiver means further including logic means responsive to said outputs of said shift register means for causing said display to indicate when the series of pulses on the probe contacted member includes no identifying pulses superimposed thereon.

7. An apparatus for distinguishing and identifying one member from a plurality of identical members, such as a conductor in a cable having a substantial number of conductors, comprising transmitter means for generating a uniform series of identical pulses having superimposed thereon a signal peculiar to each member to form a unique composite signal for each member, said transmitter means including means applying said composite signals to respective ones of said members for uniquely labeling same, the number of pulses in said series being at least equal to the number of members, said superimposed signal comprising an identifying pulse superimposed on said series adjacent a different one of said first mentioned pulses for each member to produce a different composite pulse series applied to each such member, and receiver means responsive to the composite signal on a member for detecting and recording the superimposed signal whereby to positively identify such member, said receiver means including a first detector means for detecting the first occurring identifying pulse in said composite series carried by a given member and means responsive thereto for displaying the identity of such member, said receiver means further including a second detector means responsive to occurrence of a second identifying pulse in such composite series for indicating a fault in the cable.

8. An apparatus for distinguishing and identifying one member from a plurality of identical members, such as a conductor in a cable having a substantial number of conductors, comprising transmitter means for generating a uniform series of identical pulses having superimposed thereon a signal peculiar to each member to form a unique composite signal for each member, said transmitter means including master generator means for generating a series of master timing pulses each marking a first time period, clock generating means responsive to said generator means for generating said series of identical pulses, said series of identical pulses comprising a fixed number of regularly spaced clock pulses of a first width and occurring during each said first time period; said number of clock pulses being related in a preselected manner to the number of members, and means responsive to said clock generating means for producing said signals peculiar to each member, said signals comprising identifying pulses at a second width greater than said first width to be superimposed on said clock pulse series, each such identifying pulse having a fixed time relation to a different one of said clock pulses in said series and extending therebeyond by a fixed duration, said transmitter means including means applying said composite signals to respective ones of said members for uniquely labeling same, said applying means including means imposing the same clock pulse series on each of said members but with at least one of said identifying pulses superimposed on such clock pulse series and with the combined pattern of clock and identifying pulses imposed on each member being unique, and receiver means responsive to the composite signal on a member for detecting and recording the superimposed signal whereby to positively identify such member, said detecting and recording receiver means including a probe connectible to at least one said member and means coupled thereto and responsive to said combined pattern for uniquely identifying said member, said pattern responsive means including detector means responsive to the greater width of said superimposed identifying pulses for detecting the occurrance thereof and distinguishing same from said clock pulses, display means and decoder means coupled between the output of said detector means and said display means for causing said display means to indicate the identity of the one of said members contacted by said probe.

* * * * *